United States Patent [19]

Reed et al.

[11] 3,707,785
[45] Jan. 2, 1973

[54] TEACHING APPARATUS

[76] Inventors: Bruce D. Reed, 2112 Cloverdale, Arlington, Tex. 76010; Herbert Franklin O'Dell, 807 J Place, Plano, Tex. 75074

[22] Filed: Dec. 11, 1970

[21] Appl. No.: 97,230

[52] U.S. Cl. ............................. 35/35 C, 179/100.2 T
[51] Int. Cl. .......................... G09b 5/06, G11b 5/00
[58] Field of Search ......... 35/35 C, 8 A; 179/100.2 T; 274/4 J

[56] References Cited

UNITED STATES PATENTS

| | | | |
|---|---|---|---|
| 3,609,885 | 10/1971 | Bram | 35/35 C |
| 3,648,387 | 3/1972 | Lahr | 35/8 A |
| 3,659,357 | 5/1972 | Martinesco et al. | 35/35 C |
| 3,521,007 | 7/1970 | Laghaie | 35/35 C X |
| 3,471,654 | 10/1969 | Dollenmayer | 179/100.2 T |
| 3,255,537 | 6/1966 | Cole et al. | 35/35 C |
| 3,307,274 | 3/1967 | Glaser | 35/35 C |

Primary Examiner—Wm. H. Grieb
Attorney—Cecil L. Wood

[57] ABSTRACT

Apparatus for presenting information in both audible and either visible or tactile form includes a base for supporting and locating one or more lesson cards on which the information is presented in adjacent horizontal lines. The apparatus includes a carriage movable across the base for line selection, with the line selection carriage carrying two laterally movable carriages. One laterally movable read carriage carries a pick-up head, for detecting the line of magnetically recorded information, and an indicator for indicating the corresponding visible or tactile information. The other laterally movable control carriage coacts with cam means on the base for effecting line-by-line advance of the line selection carriage, and coacts with control means for controlling the operation of the apparatus.

16 Claims, 13 Drawing Figures

INVENTORS
Bruce D. Reed
Herbert Franklin O'Dell
BY

ATTORNEY

INVENTORS
Bruce D. Reed
BY Herbert Franklin O'Dell

*Cecil L. Wood*
ATTORNEY

INVENTORS
Bruce D. Reed
BY Herbert Franklin O'Dell

*Cecil L. Wood*
ATTORNEY

INVENTORS
Bruce D. Reed
BY Herbert Franklin O'Dell

ATTORNEY

TEACHING APPARATUS

BACKGROUND AND SUMMARY OF THE INVENTION

This invention relates to apparatus for the simultaneous presentation of audible and either visible or tactile information. More particularly, the invention relates to teaching apparatus, for example, wherein information is presented simultaneously in either audible and visible form or audible and tactile form. In the description which follows, reference will be made primarily to the presentation of information simultaneously in audible and visible form wherein the visible information is printed on a sheet of paper or other suitable material. It will be understood, however, that the references to visible printed information are intended to include the tactile information, such as characters of the Braille system which are impressed or otherwise formed on a sheet of paper or other suitable material.

An object of this invention is to provide an improved teaching system which fulfills the "Talking Book" concept as practically as present technology will permit by using audio-visual material with a fixed physical relationship between the recorded and printed lesson segments so that immediate selective access to the audio supplemented visual text is available to the student in a manner normal to the student's experience with printed only materials.

Another object of this invention is to provide teaching apparatus, for use with such teaching systems, which is of a size and form that offers maximum utility under varying conditions of use.

A further object of this invention is to provide a teaching apparatus which enables the student to teach himself the meaning of tactile or visible information by conveniently synchronizing it with its audible equivalent.

Still another object of this invention is to provide a useful teaching apparatus which allows the student to study at his own learning pace and conveniently to repeat all or any portion of a lesson as many times as desired in accordance with sound educational principles.

A still further object of this invention is to provide a teaching apparatus which is compact and of a size to be completely carried from place to place by the student, and which has simple and effective controls for maximum utility by the student.

Apparatus according to the invention for accomplishing these objects includes a base having means for supporting and locating teaching material in sheet form which is provided with horizontal line groups of recorded and printed information. A line selection carriage traverses the frame and sheet material vertically, and carries laterally movable read and control carriages. The read carriage carries a pick-up head for detecting a line of audio information and an indicator for indicating the corresponding visually presented information. The control carriage has means coacting with cam means on the base to effect advancement of the line selection carriage, and to actuate other controls for the apparatus. Drive means are provided for reciprocating the line selection, read, and operate carriages; and suitable controls are provided for either manual or automatic operation.

The novel features and the advantages of the invention, as well as additional objects thereof, will be understood more fully from the following description when read in connection with the accompanying drawings.

In the following description of one form of apparatus according to the invention, reference will be made to movements of machine components in X, Y or Z directions or to X, Y and Z motion. The directions of these motions are illustrated by the double-headed arrows in FIG. 9. Relating these movements to the presentation of the information on lesson cards or sheets as appropriately located on the machine, the lines of information are horizontal and parallel and located along lines of X or lateral movement. The lines are spaced vertically, with reference to the printed pages or spaced in the direction of Y motion which is perpendicular to the lines of information. The illustrated machine is designed to accommodate a single information sheet or a stack of information sheets; and accordingly the read head is mounted to move vertically relative to the machine frame, or in a Z direction.

The information medium illustrated for use with the machine consists of a stack or book of lesson cards 10. In the form illustrated in FIG. 2 of the drawing, the lesson cards 10 are bound in book form by means of binding rings. These lesson cards may be fabricated of paper or other suitable material, for example, and may or may not be bound. The machine is designed to accommodate one or a stack of lesson cards which are appropriately located or indexed relative to the pick-up head. While reference will be made to the lesson cards 10 in the following description, it should be understood that the machine may be designed to accommodate other modes for presenting the information such as a continuous web of paper or other suitable material.

Figure 2:
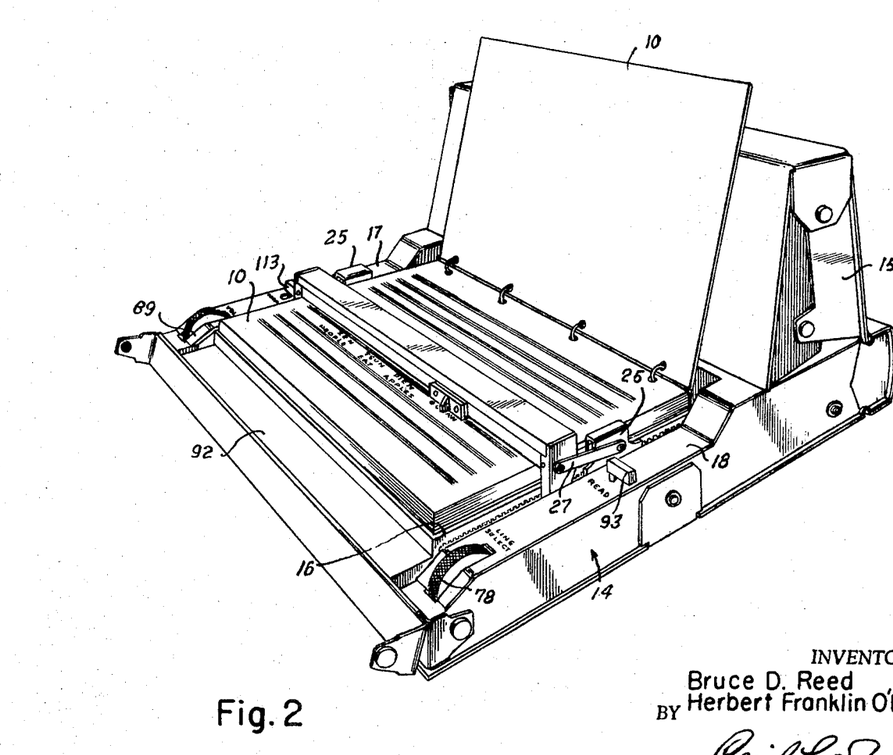
FIG. 2 is a perspective view of the apparatus of FIG. 1, with the cover open and with teaching material in ring-bound book form positioned in the apparatus.

Again referring to FIG. 2, the information is presented on the cards in spaced, horizontal line groups, oriented in the X direction referred to above. Each line group includes a line 11 of magnetically recorded information and one or more adjacent printed lines 12 presenting corresponding information in printed form. As indicated in FIG. 2, the printed information in the lines 12 may be in two languages, where the lesson card is a language lesson for example. For such a lesson, the machine might present the information visually in both English and a foreign language and audibly in the foreign language. In lieu of printed information, the line 12 may alternatively contain embossed information in the form of characters in the Braille system for example, in which case of course the lesson card presents the information in the Braille system and audibly for use in teaching the blind.

Referring to the teaching machine generally, with particular reference to FIGS. 1, 2, 3, 5 and 9, the machine includes a base or frame 14 which defines a generally flat rectangular form for the machine. Preferably, the frame is a unitary member fabricated of a lightweight plastic material, for example. For portability, the frame may be enclosed by a suitable casing as well as a closure cover 15 to protect the machine and present a pleasing appearance. The closure cover 15 is shown only in FIGS. 1 and 2, with the machine being shown in FIG. 1 in condition for carrying or storage; and in FIG. 2 the closure cover is positioned to provide a suitable support for certain of the lesson cards 10 of a lesson card book.

Figure 1:
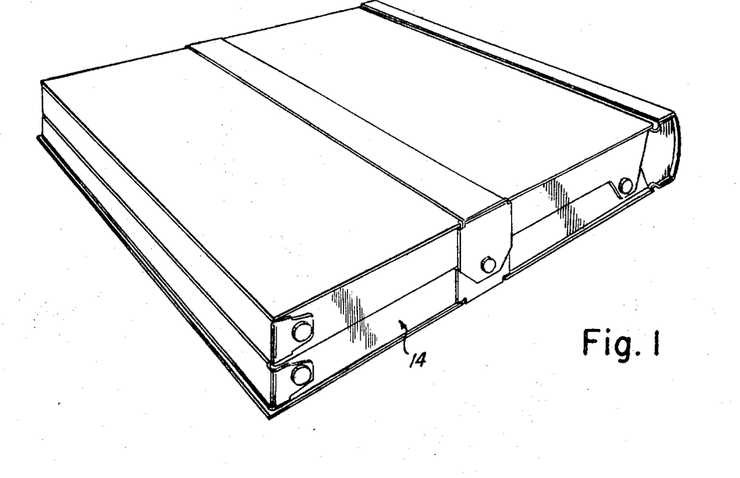
FIG. 1 is a perspective view of teaching apparatus according to the invention with an enclosing cover in the closed position for storing or transporting the apparatus.
Figure 3:
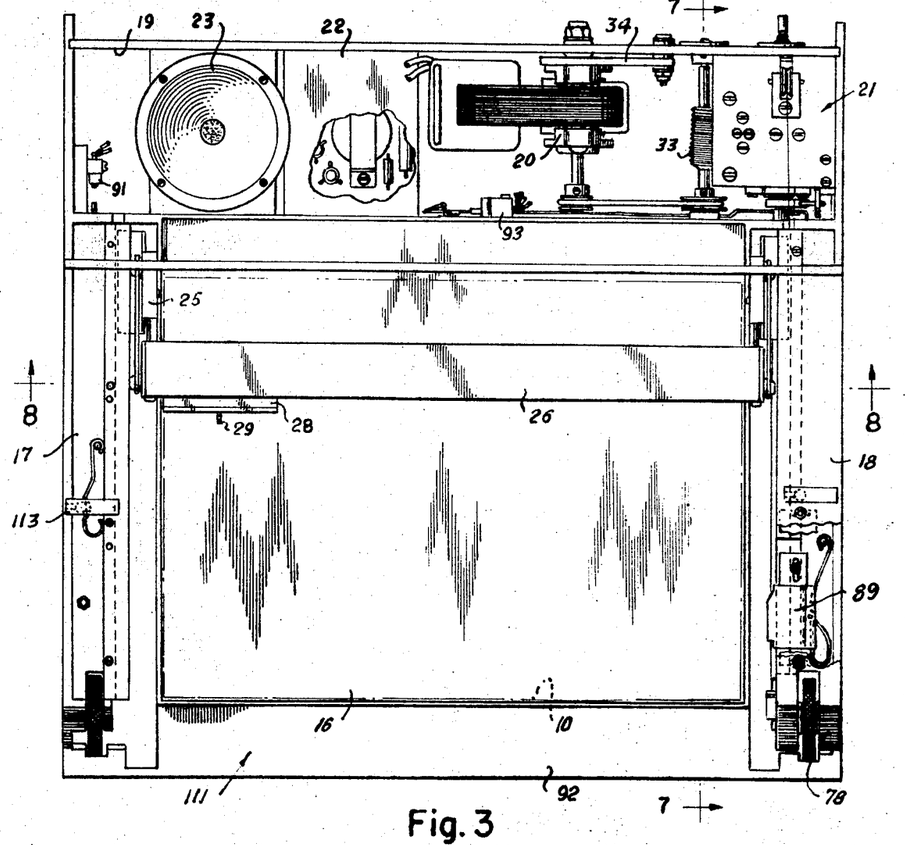
FIG. 3 is a top view of the apparatus of FIG. 2 with the cover and portions of the case removed to illustrate internal components of the apparatus.
Figure 4:
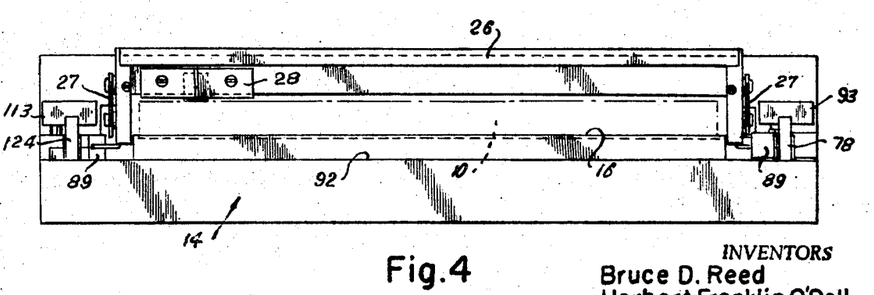
FIG. 4 is a front view of the apparatus of FIG. 3.

In FIGS. 1 and 2, the machine is viewed from its front and right sides. As best seen in FIGS. 2 and 3 the upper surface of the machine frame 14 defines a central support panel 16 adjacent to the front thereof for supporting the lesson cards 10, with left and right control panels 17 and 18 being positioned to either side of the support panel. The rearward portion of the machine includes a chamber 19 for supporting and enclosing machine components such as a motor 20, a transmission 21, an amplifier 22, and a speaker 23 and associated components and controls.

For selecting respective line groups 11, 12 of information on a lesson card, the machine is provided with a line selection carriage or line carriage 25 which is reciprocable across the frame 14 in a Y direction. The line carriage includes a base portion which extends laterally in an X direction beneath a support panel 16, and upwardly extending end members which extend through a pair of longitudinal slots oriented in a Y direction between the support panel 16 and the respective control panels 17 and 18. The line carriage 25 includes an associated head carriage 26, the head carriage including a base portion which extends laterally above the support panel 16 and downwardly extending end members which are disposed in the same frame slots. The head carriage is positioned forwardly of the line carriage with the respective end members being longitudinally aligned in the frame slots; and the respective carriage end members are pivotally coupled to each other through a pair of parallel arms 27 at each and defining a parallelogram linkage. In this manner, the head carriage, while being carried in a Y direction with the line carriage is also permitted to reciprocate (actually oscillate) in a vertical or Z direction to accommodate a stack of lesson cards 10 of varying thickness.

A read carriage 28 is mounted on the head carriage 26 for reciprocating movement in an X direction, the read carriage carrying a magnetic pick-up head 31 for detecting the magnetically recorded information from a line 11, and an indicator or pointer 29 for indicating the corresponding printed information on a line 12. In the case where embossed Braille characters are presented in the lines 12, the indicator 29 may serve as a guide member to guide the fingers of the student along the line 12 to read the Braille characters simultaneously with the audible presentation of the recorded information as detected by the pick-up head 31.

A control carriage 50 is mounted for reciprocating X motion on the lateral base portion of the line carriage 25 beneath the support panel 16. The control carriage moves simultaneously with the read carriage, but in the opposite direction, and serves primarily to carry and actuate certain machine controls as will be described.

Figure 5:
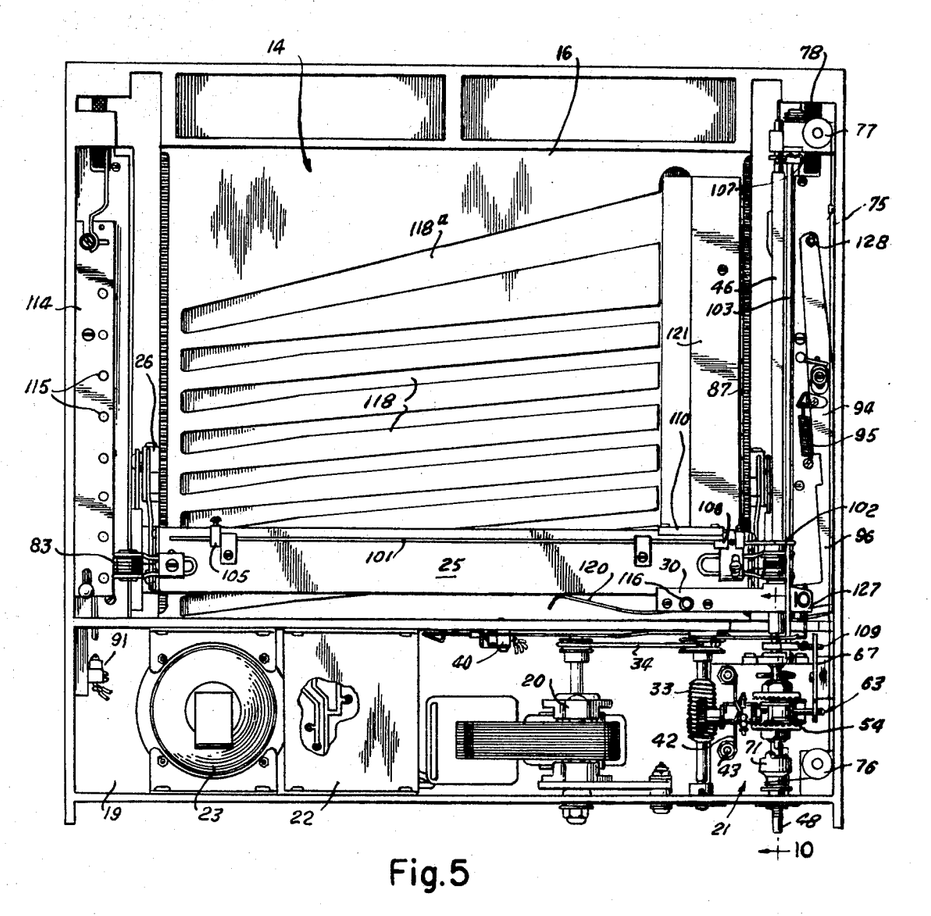
FIG. 5 is a bottom view of the apparatus of FIG. 3 with a bottom case panel removed to show the internal components.
Figure 11:
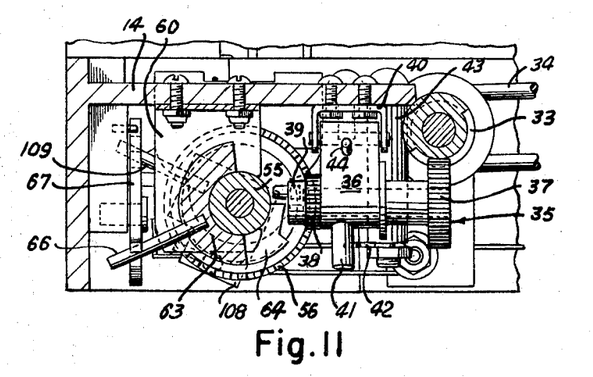
FIG. 11 is a transverse sectional view taken along the line 11—11 of FIG. 10 further illustrating the drive mechanism.

The power train and drive mechanism for the machine includes the motor 20, which is preferably an electric motor, and which in the described embodiment is undirectional. The motor 20 drives a worm 33 through a drive belt 34 and associated pulleys mounted on the motor and worm shafts. As best seen in FIGS. 5 and 11, the worm 33 drives a shaft assembly 35 which consists of a housing 36 rotatably supporting a shaft having non-rotatably fixed thereon a worm gear 37, a pinion 38, and an eccentric 39 defined by a disc with an eccentrically mounted pin. As best seen in FIG. 11, the housing 36 is pivotally supported from the frame 14 by means of a U-shaped bracket 40. As so pivotally supported, the housing may oscillate between selected forward and rearward operative positions, with the worm gear 37 maintaining its driving relation with the worm 33 during such oscillation.

Figure 10:
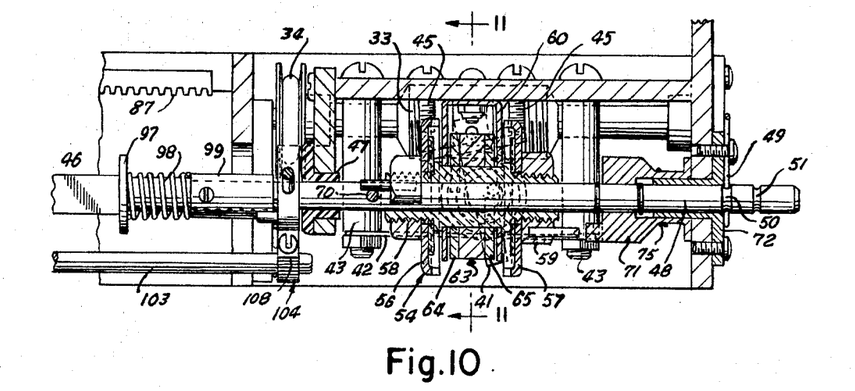
FIG. 10 is a fragmentary sectional view taken along the line 10—10 of FIG. 5 illustrating a portion of drive mechanism.

While the mechanism for shifting of the shift assembly 35 will be described subsequently, it will be seen that the housing is maintained in the selected operative position by means of a downwardly extending pin 41 which coacts with a spring 42 supported on suitable posts 43 as best seen in FIGS. 5 and 10. As best seen in FIG. 5, the spring is a wire spring suspended between the posts and includes a boss or projection which is deflected by the pin 41 as it is moved between its operative positions and tends to maintain the pin in the selected operative position. This positioning device, or a similar device, is particularly desirable to retain the assembly in the selected position when the reaction between the worm and worm gear tends to shift the assembly out of the selected operative position. A stop pin 44 extending through the housing 36 engages stop screws 45 (FIG. 10) to fix the operative positions of the shift assembly.

Figure 6:
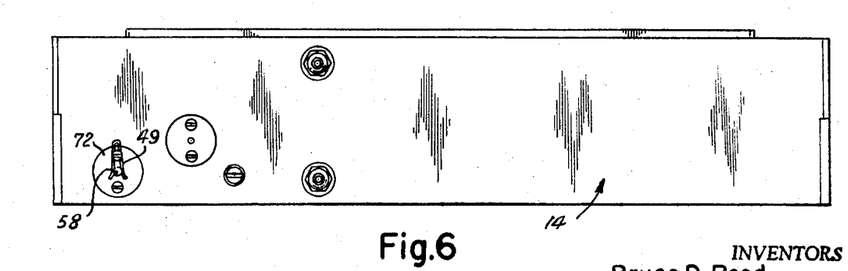
FIG. 6 is a rear view of the apparatus of FIG. 3.

All of the above-mentioned carriages are driven through a spline shaft 46, which underlies the control panel 18, and associated cable drive systems. The spline shaft extends substantially the length of the machine being rotatably supported in suitable bearings adjacent the front and rear of the machine frame and also by means of an intermediate bearing 47 in the chamber 19. The forward portion of the shaft defines the spline portion, being square in cross-section for example, while the rearward portion 48 is circular in cross-section defining a cylindrical portion for supporting components to be described. The spline shaft 46 is axially shiftable between forward and rear positions, by means to be described, and is maintained in the selected forward or rearward positions by a spring 49 coacting with annular grooves 50 and 51 as best seen in FIGS. 6 and 10. In FIG. 10 the spline shaft is shown in its rearward position, which may be considered the normal position, wherein the spring 49 is received in the forward groove 50. In the forward position of the spline shaft, the rearward groove 51 will be positioned to receive the spring 49.

Referring now particularly to FIGS. 5, 10 and 11, a reversing drive assembly 54, driven by the pinion 38 of the shift assembly 45, is rotatably supported on the journal portion 48 of the spline shaft 46. The reversing drive assembly 54 includes a sleeve housing 55 received over the journal portion 48, the sleeve housing defining a central journal portion terminating in spaced annular ribs which define oppositely facing shoulders for locating forward and rearward face gears 56 and 57 respectively. The face gears are mounted on respective reduced diameter threaded ends of the sleeve housing 55, and are secured thereto by respective forward and rearward drive nuts 58 and 59. Each of the drive nuts includes an eccentrically mounted drive pin the functions of which will be described subsequently. The above-described reversing drive assembly 54 is an integral rotating assembly; and is axially confined relative to the frame 14 by a U-shaped bracket 60 attached to the frame, the downwardly extending legs of which partially surround the journal portion of the sleeve housing 55 adjacent to the spaced annular ribs. It will be seen then that the reversing drive assembly is rotatably supported relative to the machine frame while being axially confined relative thereto, and is rotatably supported on the spline shaft 46 permitting the above-mentioned axial shifting of the spline shaft relative to the reversing drive assembly.

As best seen in FIGS. 5 and 10, the face gears 56 and 57 of the reversing drive assembly 54 have confronting annular teeth, with the confronting teeth being spaced apart axially a distance greater than the diameter of the shift assembly pinion 38. The pinion 38 is positioned between the face gear teeth and engages one or the other of the face gears in driving relation in the respective forward and rearward operative positions of the shift assembly.

To effect the shifting of the shift assembly, a reversing yoke 63 including forward and rearward parallel interference plates 64 and 65 is rotatably supported on the journal portion of the sleeve housing 55, between the legs of the support bracket 60, and includes a radially extending arm 66 for the purpose of oscillating the yoke between the first and second control positions. The radial arm 66 is oscillated through a pivot arm 67 through mechanism to be described subsequently.

In FIG. 11, which is a view looking from the rear of the machine, the reversing yoke 63 is shown in its first operative position wherein it has been rotated to its counterclockwise limit. In this position an edge 68 of the forward interference plate 64 is rotated into position to be engaged by the eccentric pin 39 of the shift assembly 35. The assembly of the worm gear 37, pinion 38 and the eccentric pin 39 are always rotating in a counter-clockwise direction, as viewed from the worm gear end of this assembly, and the relative positions of the forward interference plate 64 and eccentric pin are such that the shift assembly will have been shifted to its rearward operative position (as seen in FIG. 10) and toward the viewer (as seen in FIG. 11). In this position then the shift assembly pinion 38 is engaged with the teeth of the rearward face gear 57 to drive the reversing drive assembly 54 in a counter-clockwise direction, as viewed from the front of the machine. This, as will be seen from the description of operation, is the normal driving condition of the machine.

When the reversing yoke has shifted to its other operative position, that is rotated clockwise, as viewed in FIG. 11, the edge 68 of the forward interference plate is rotated out of its interference position with the eccentric pin 39. The corresponding edge of the rearward interference plate 65 is then rotated into position and to be engaged by the eccentric pin 39 to effect a shifting of the shift assembly to its forward operative position to engage the pinion 38 with the forward face gear 56 of the reversing drive assembly. The reversing drive assembly is then driven clockwise, as viewed from the front of the machine.

In the rearward position of the spline shaft 46, as illustrated in FIG. 10, a transverse drive pin 70, extending through the journal portion 58 of the spline shaft, is positioned to be engaged by the eccentric drive pin of the reversing drive assembly forward drive nut 58. In this rearward position of this spline shaft, then, the spline shaft will be driven by the reversing drive assembly 54 in the direction as determined by the position of the shift assembly 35. When the spline shaft is shifted to its forward position, as determined by the engagement of the spring 49 with the rearward groove 51, the drive pin 70 is disengaged from the forward drive nut and a line carriage drive pulley 71, which is axially confined on the journal portion of the spline shaft, is carried forward into driving engagement with the eccentric drive pin of the rearward drive nut 59.

The drive pulley 71 is rotatably supported on a bushing 72, mounted on a rearward frame wall, and also on the journal portion of the spline shaft. The bushing 72 also defines the bearing support for the rearward end of the spline shaft. The drive pulley is axially confined on the journal portion of the spline shaft by means of a pair of snap rings 73 received in appropriate annular grooves in the shaft; and the forward face of the pulley is provided with an eccentric boss for driving engagement with the drive pin of the rearward drive nut 59.

Figure 7:
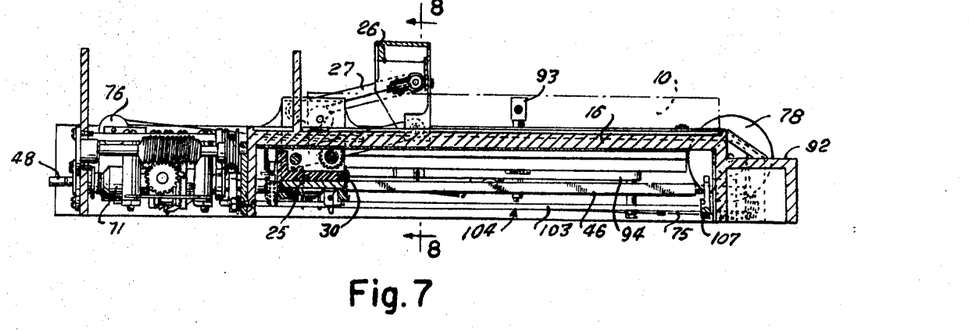
FIG. 7 is a transverse sectional view taken along the line 7—7 of FIG. 3.

The cable drive system for the line carriage 25 is best seen in FIGS. 5 and 7 and includes a Y-drive cable 75 which is wound around the drive pulley for several turns to provide sufficient driving friction, idler pulleys 76 mounted at the rear of the frame adjacent to the drive pulley, idler pulleys 77 mounted at the front of the machine, and a manual drive wheel 78 mounted at the front of the machine. As will be seen, the power driven drive pulley 71 is operated to transport the line carriage 25 and associated head carriage 26 from the front to the rear of the machine, while other mechanism to be described advances the line and head carriages from the rear to front on a line-by-line basis. The manual drive wheel 78 is provided for manual positioning of the line carriage over any selected line group of a lesson card.

To maintain lateral alignment of the line and head carriages during the traversals in the Y direction, a stabilizing shaft 85 rotatably mounted on the line carriage carries pinions 86 fixed to its opposite ends; and the pinions engage parallel racks 87 mounted on the underside of the support panel 16 on the opposite sides thereof.

Figure 8:
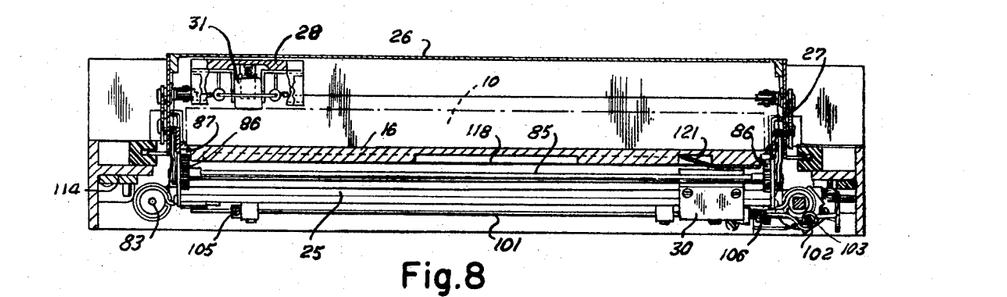
FIG. 8 is a transverse sectional view taken along the line 8—8 of FIGS. 3 and 7.
Figure 9:
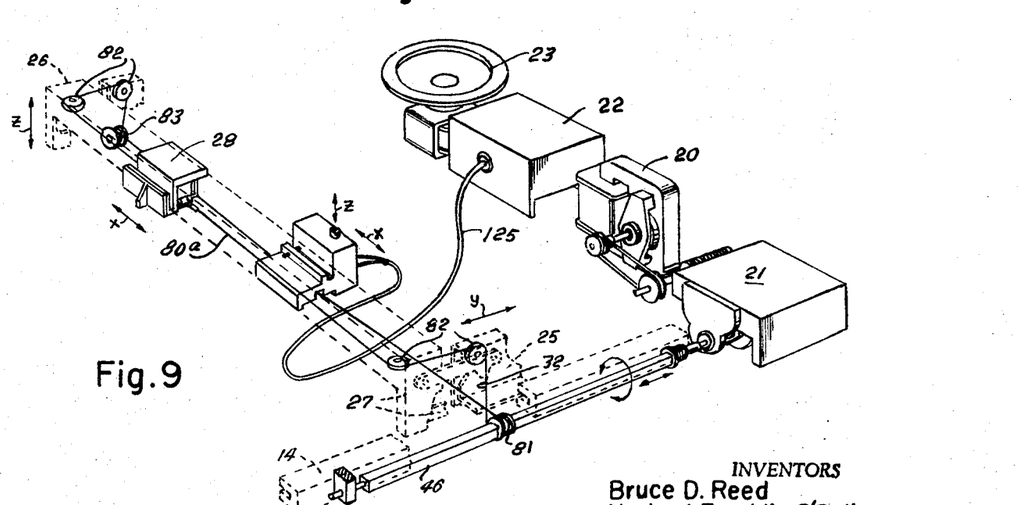
FIG. 9 is a fragmentary perspective view of certain components of the apparatus of FIG. 2 particularly illustrating the drive system.

A cable drive system for the read carriage 28 and the control carriage 30, which move in the X direction, is best seen in the diagrammatic illustration of FIG. 9. the starting positions for these carriages are shown in FIG. 8, wherein the read carriage is positioned at the extreme left of its range of travel, while the control carriage is positioned at the extreme right of its range of travel. In FIG. 9, these carriages are shown displaced from the starting positions. As indicated above, the read carriage and control carriage move simultaneously in opposite directions, and are driven by the same cable system.

Referring now particularly to FIG. 9, the X-drive cable 80 is driven by a drive pulley 81, mounted for rotation on the line carriage 25 and confined against relative axial movement. The drive pulley 81 has a base of square cross-section to be received in sliding relation on the spline portion of the spline shaft 46 and in a manner to be driven by the spline shaft when the line carriage and associated head carriage are traversing the machine from the rear toward the front. The upper run 80a of the X-drive cable passes from the drive pulley 81 over appropriate idler pulleys 82 mounted on the line and head carriages and is coupled to the read carriage 28 in any suitable manner. The lower run 80b of the drive cable passes over an idler pulley 83 on the line carriage and is appropriately coupled to the control carriage 30.

Referring now to the overall controls for the machine, electric energy is supplied to the drive motor 20 through a motor switch 90 and an auto switch 91 both mounted within the frame chamber 19. The motor switch 90 is the main control switch for the motor; and the auto switch 91 is connected in electrical parallel with the motor switch to maintain operation of the motor during certain phases of automatic mode operation as will be described.

Figure 13:
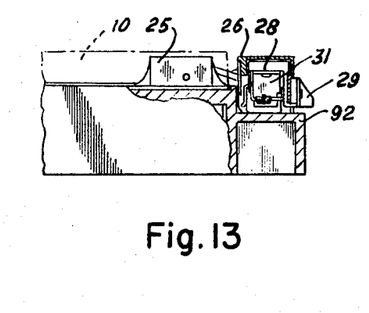
FIG. 13 is a fragmentary side view of the front portion of the machine, illustrating the line carriage and the head carriage in the start position.

At the start of the machine cycle, the read and control carriages are at their respective left and right hand start positions, and the line and head carriages are at start positions at the front of the machine, as best seen in FIG. 13. The frame 14 provides a shelf 92, for supporting the head carriage 26 in the start position.

To start the machine, a read lever 93, mounted on the right hand control panel 18, is actuated by the student. Actuation of this read lever effects movement of a read control bar 94, best seen in FIG. 5, forward against a force of a biasing spring 95. The read control bar 94 is an L-shaped bar having a rear transverse dog 96; and in the start condition of the machine, this bar is rotated slightly clockwise from the position shown in FIG. 5, by coating interference members on the control carriage 30 and the forward end of the bar. In the start position of the control bar, the dog 96 is positioned behind a collar 97 on the spline shaft 46. The collar 97 is best seen in FIG. 10 and consists of a washer fitted over the journal portion of the spline shaft and urged forwardly by a coil spring 98 against a shoulder defined between the spline portion and the journal portion. The coil spring is compressed and axially confined by a sleeve 99 suitably locked on the spline shaft. Operation of the read lever 93 by the user then, effects a shifting of the spline shaft 46 to its forward position, wherein the line carriage drive pulley 71 is positioned to be driven by the reversing drive assembly 54. The forward shifting of the read control bar 94 also acts to close the motor switch 90, through a suitable control linkage, to start the drive motor 20. The line and head carriages are then driven from the front toward the rear of the machine. The head carriage is initially lifted from its supporting shelf 92 to the surface of the lesson cards 10 supported on the support panel 16 by camming detents 32 provided on certain of the supporting arms 27 coating cam members 89 (FIG. 3) mounted under the control panels 17 and 18.

When the line carriage reaches its rearward limit, an abutment on the carriage engages the collar washers 97 on the spline shaft to shift the shaft to its rearward position. The line carriage drive pulley 71 is then disengaged from the reversing drive assembly 54, and the spline shaft drive pin 70 is positioned to be engaged by the reversing drive assembly 54 to rotate the spline shaft in a counter-clockwise direction, as determined by the rearward operative position of the shift assembly 35. In the rearward position of the head carriage 26, the magnetic pick-up head 31 is positioned to overlie the top line 11 of recorded information while the pointer 29 is in position to scan the corresponding printed information on the topmost of line 12.

The machine is then conditioned for the read operation which consists of X movement of the read carriage 28 from left to right and corresponding X movement of the control carriage 30 from right to left. This read operation begins as soon as the spline shaft has shifted to its rearward position into driving relation with the reversing drive assembly 54.

The line carriage 25 and the control carriage 30 include coacting means for controlling the reversal of the spline shaft drive to shift between the read operation and the rescan operation, wherein the read and control carriages are reversed and return to the respective start positions. As best seen in FIGS. 5 and 8, a trip rod 101 is mounted for reciprocating movement in suitable bearing members on the underside of the line carriage 25, and has an eye head 102 formed at its right hand end for accommodating a rod 103 of a rocker assembly 104. Left and right stops 105 and 106, respectively, are adjustably secured to the trip rod 101.

The rocker assembly 104 is pivotally mounted on the spline shaft 46 and includes a pivot bracket 107, pivotally supporting the rod 103 adjacent to the forward end of the spline shaft, and a bell crank 108 pivotally supporting the rearward end of the rod 103 on the journal portion of the spline shaft within the chamber 19. The rod 103 is rigidly secured to both the pivot bracket and the bell crank to support the rod in parallel relation to the spline shaft in a manner that the rocker assembly will pivot about the spline shaft with a minimal relative twisting. As mentioned above, the rod 103 passes through the eyelet 102 of the trip rod 101 so that the pivotal movement of the rocker assembly 104 is controlled by the trip rod 101.

The bell crank 108, as best seen in FIGS. 10 and 11, includes a radial arm 109 which coacts with the pivot arm 67 to oscillate the reversing yoke 63 through its radial arm 66. In the start position of the control carriage, an abutment of this carriage has engaged the right trip rod stop 106, thereby shifting the trip rod to the right and oscillating the rocker assembly 104 counter-clockwise, as viewed from the front of the machine. This counter-clockwise rotation of the rocker assembly has effected a clockwise rotation of the reversing yoke 63 to the position shown in FIG. 11, wherein the forward interference plate 64 has positioned the shift assembly 35 for driving the reversing drive assembly 54 and the spline shaft in the counter-clockwise direction, which is the direction to drive the read and control carriage for the read operation.

At the end of the read operation, the control carriage engages the left trip rod stop 105. This effects a clockwise rotation of the rocket assembly 104 and a corresponding counter-clockwise rotation of the reversing yoke 63. The rearward interference plate 65 is then positioned to be engaged by the shift assembly eccentric 39, thereby shifting the shift assembly forward to engage the pinion 38 with the forward face gear 56. This effects clockwise drive of the reversing drive assembly 54 and the spline shaft 46 to drive the read and control carriages in a reverse direction for the rescan operation which returns these carriages to their start positions. The clockwise rotation of the rocker assembly 104 also acts, through suitable linkage, to close the motor switch 90 if it is not already closed, for a reason to be described.

When the control carriage 30 reaches its start position it again engages the right trip rod stop 106 to again reverse the spline shaft drive for counter-clockwise rotation. The rotation of the rocker assembly 104 at this time also acts through suitable linkages to open the motor switch 90. In the manual mode of operation, this opening of the motor switch 90 will shut off the motor 20. Following this, the student may again actuate the read lever 93, which will close the motor switch to effect operation of the machine through a read and rescan operation for the same line group 11, 12 after which the motor switch 90 will again be opened to shut off the machine. The student may repeat this procedure any number of times for a repeat reading of the same line group. Additionally, the student may shift the line carriage 25 by means of the manual drive wheel 78 to select any line group on the lesson card 10 and thereafter effect a reading of the newly selected line group any number of times through repeated operation of the read lever 93. This is the manual mode of operation for use of the machine.

Repeated operation of the read lever 93 to reclose the motor switch during its manual mode operation does not act to shift the spline shaft 46, as in starting the machine when the line carriage 25 is in the start position. When the line carriage has moved slightly away from the start position, the read control bar 94 is permitted to rotate to the position shown in FIG. 5, through the spring 95, wherein the dog 96 is not in position to engage the spline shaft collar 97.

The automatic mode of operation for the machine, is different from the manual mode in that the line and head carriages will automatically advance forward to a succeeding line group on the lesson card after each read operation; and the advancing is effected by the control carriage during the rescan operation.

To place the machine in the automatic mode, a mode lever 113, which is mounted on the left control panel 17, is moved to the auto position. The mode lever is coupled to an elongated peg bar 114, mounted on the underside of the panel 17. This peg bar carries a row of downward extending pegs 105 which are spaced apart in a Y direction a distance corresponding to the spacing of the line groups 11, 12 on the lesson cards 10. In FIG. 5, the peg bar is shown in a forward position, which is the position for the manual mode 1 of operation, and is moved to a rearward position for the automatic mode of operation. The peg bar is resiliently held in either selected position. In the rearward position, the auto switch 91 is engaged by a finger associated with the peg bar to close the auto switch, which acts as a bypass switch to keep the motor 20 running regardless of the condition of the motor switch 90.

Figure 12:
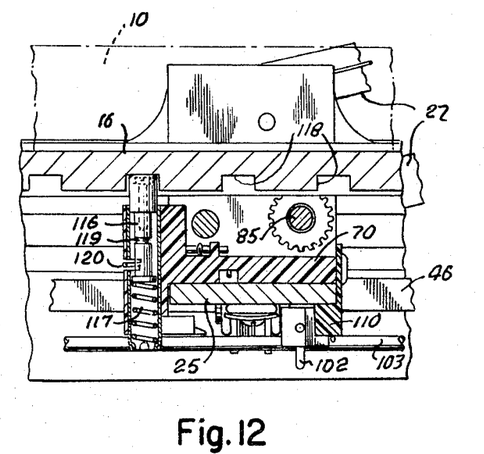
FIG. 12 is an enlarged fragmentary view, partially in section, of the control carriage and associated parts as seen in FIG. 7, taken along the line 12—12 of FIG. 3.

Referring now to the read operation as above described, the control carriage 30 is driven from right to left toward the peg bar 114 as seen in FIG. 5. As best seen in FIG. 12, the control carriage carries a plunger 116 supported for reciprocating vertical or Z movement, and urged upwardly by a coil spring 117. As best seen in FIGS. 5 and 12, and frame 14 on the underside of the support panel 16 is provided with a plurality of cam grooves 118 which are slightly inclined relative to the X direction. The upper end of the plunger 116 is dimensioned to be received within these cam grooves, and is urged into the cam grooves by the spring 117. The plunger stem is provided with an annular groove 119, dimensioned to receive a latch spring 120. The latch spring is mounted on the control carriage to be urged into the plunger groove in a manner that when the plunger is depressed downwardly to align the groove and spring, the latch spring will retain the plunger in a latched position out of engagement with the cam grooves 118. The plunger is normally in a latched condition.

As seen in FIG. 5, the latch spring 120 extends in an X direction toward the peg bar 114; and when the control carriage approaches its limit of travel at the end of the read operation, the free end of the latch spring engages a respective peg 115 to deflect the spring rearwardly thereby releasing the plunger 116 for upward movement into a respective cam groove. Simultaneously, of course, the trip rod 101 is shifted to effect reversal of the spline shaft drive to effect the rescan operation. During this rescan operation, the plunger 116 rides in the respective cam groove 118 to effect forward movement of the line and head carriages 25 and 26 to advance the recording head 31 to the succeeding recorded line 11 on the lesson card.

As the control carriage approaches the right hand limit of travel, the plunger head moves out of a cam groove and is urged downwardly by a reset cam 121 which is a longitudinal member either formed or attached to the machine frame and extending in a Y direction along the right hand side of the frame support panel 16. The reset cam moves the plunger downward a distance sufficient to align the plunger groove 119 with the latch spring 120 to latch the plunger for the succeeding read operation. When the control carriage reaches the right hand limit of travel, the trip rod 101 effects the reversal of spline shaft drive in a manner previously described through the rocker assembly 104; and the rocker assembly also opens the motor switch 90, as previously described. However, since the auto switch 91 is held closed by the peg bar 114, the motor does not shut off and the machine proceeds through a succeeding read cycle.

So long as the mode lever 113 remains in the auto position, the machine will read each line group on the lesson card once and automatically advance to the succeeding line group until the bottom line group of the lesson card has been read.

After the bottom line group of the lesson card has been read, the plunger 116 is engaged in the forward-most cam groove 118a which effects movement of the line and head carriages to the start positions. When the line carriage 25 reaches its start position, mating interference members on the line carriage and the peg bar 114 engage each other to move the peg bar forward against the resilient latch control a distance sufficient to open the auto switch 91. This merely conditions the machine to be finally shut off through the motor switch 90 which was closed at the end of the preceding read operation. Then as the control carriage 30 moves finally to its start position, a camming abutment 127 on the control carriage engages a pin 128 the forward end of the read bar 94 to rotate this bar clockwise from the illustrated FIG. 5 position to position the read lever dog 96 behind the spline shaft collar 97, as previously described. This conditions the machine for shifting the spline shaft 46 forward at the beginning of a new machine cycle. At the same time this movement of the control carriage toward the right acts through the trip rod 101 to reverse the spline shaft drive mechanism for a read operation when the machine is next turned on; and simultaneously the motor switch 90 is opened to shut off the motor 20. This completes the automatic machine cycle, and the machine is conditioned for a new automatic cycle merely by actuating the read switch 93.

It should be noted that any movement of the line carriage 25 rearward from the start position, whether under power or manually through the manual drive wheel 78, disengages the control carriage abutment 127 from the read control bar pin 128 to permit rotation of this bar to the FIG. 5 position. Thereafter, any operation of the read lever 93 will not effect forward shifting of the spline shaft, but will only effect the closing of the motor switch 90.

When the mode lever 113 is moved to the manual position, the peg bar 114 is shifted to its forward position, illustrated in FIG. 5, wherein the pegs 115 are not in position to be engaged by the control carriage latch spring 120. Accordingly, the plunger 116 is not released at the end of the read operation, and the read and control carriages are returned to their start positions without corresponding Y advance to the succeeding line group.

A thumb wheel 124, provided on the left control panel 17, may be a manual volume control for the amplifier 22 which is connected to the magnetic pick-up head 31 in the read carriage. In the illustrated machine, as best seen in FIG. 9, the signals detected by the pick-up head 31 are carried to the control carriage 30 through the X-drive cable 80 which is suitable for that purpose; and the signal is then carried to the amplifier through a cable 125.

OPERATION

The operation of the apparatus will now be described first with reference to the automatic mode.

At the beginning of a machine cycle, the line carriage 25 and the associated head carriage 26 are in the start position at the front of the machine, with the head carriage 26 resting in a storage position on the shelf 92. The read carriage 28 is at its start position at the left end of the head carriage 26; and the control carriage 30 is at its corresponding start position at the right end of the line carriage 25. The mode lever 113 is shifted to the auto position, shifting the peg bar 114 rearward in condition to close the auto switch 91 as soon as the line carriage 25 begins rearward movement, and positioning the pegs 115 to effect the release of the control carriage plunger 116. The read control bar 94 is rotated by the control carriage abutment 127 to position the dog 96 behind the spline shaft 97. The shift assembly 35 is shifted to its rearward position to drive the reversing drive assembly 54 in a counter-clockwise direction; and the spline shaft 46 is shifted to its rearward position, in driving relation with the reversing drive assembly.

To start the machine cycle, the read lever 93 is actuated by the user to momentarily shift the read control bar 94 forward against the tension of the spring 95. The forward shifting of the read control bar shifts the spline shaft 46 to its forward position and simultaneously closes the motor switch 90 to start the motor.

The shifting of the spline shaft 46 disengages the shaft from the reversing drive assembly and carries the line carriage drive pulley 71 into driving relation with the reversing drive assembly to effect rearward drive of the line and head carriages. As soon as the line carriage 25 begins to move rearward, the peg bar 114 is permitted to shift to its rearwardmost position to close the auto switch 91; and the read control lever 94 rotates to move the dog 96 out of interference alignment with the spline shaft collar 97. Also, the head carriage 26 is raised off the shelf 92 above the surface of the topmost lesson card 10 and then lowered to rest on the topmost lesson card.

At the rearward limit of travel, the line carriage engages the spline shaft collar 97 to shift the spline shaft to its rearward position, thereby disengaging the line carriage drive pulley 71 from the reversing drive assembly 54 and moving the spline shaft drive pin 70 into driving relation with the reversing drive assembly. The spline shaft is immediately driven in a counter-clockwise direction to drive the read carriage 28 from left to right and the control carriage 30 from right to left. This is a read operation of the cycle wherein the recorded information on the topmost magnetic line 11 is detected by the magnetic pick-up head 31 and corresponding printed or tactile information on the topmost line 12 is indicated by the pointer 29.

As the control carriage 30 approaches the extreme of its travel for the read operation, the plunger latch spring 120 is deflected by an associated peg 115 to release the plunger upwardly into the rearmost cam groove 118. Substantially simultaneously, trip member 110 of the control carriage engages left stop 105 to shift the trip rod 101 to the left thereby shifting the shift assembly 35 to its forward position to drive the reversing drive assembly 54 through the forward face gear 56. The reversing drive assembly and the spline shaft are then driven clockwise to drive the read and control carriages in a reverse direction through a rescan operation of the cycle back to their start positions.

As the control carriage 30 moves from left to right during the rescan portion of the cycle, the plunger 116 following the rearmost cam groove 118 effects forward movement of the line carriage 25 and the head carriage 26 so that, at the end of the reason cycle, the read carriage 28 will be positioned to read and indicate the lines 11 and 12 of the second line group of recorded and printed or tactile information.

As the control carriage approaches its start position, the head of the plunger 116 engages the reset cam 121 which urges the plunger downward to be latched by the latch spring 120. The control carriage trip member 110 engages the right stop 106 to shift the trip bar 101 to the light thereby again shifting the shift assembly 35 rearward to drive the reversing drive assembly 54 and the spline shaft 46 in the counter-clockwise direction for the subsequent read operation.

The machine will continue automatically through successive read and rescan operations, detecting and indicating the successive line groups 11, 12 from the top to the bottom of the lesson card 10.

Another function of the trip rod 101 is to affect the closing of the motor switch 90 at the end of each read operation, and the opening of the motor switch at the end of each rescan operation. This has no bearing on the operation of the machine during the automatic mode, except at the end of the machine cycle, since the drive motor 20 is operated continuously through the auto switch 91.

At the completion of the read operation for the lowermost line group, the control carriage plunger 116 is engaged with the forwardmost cam groove 118a, which during the following rescan cycle will affect forward movement of the line and head carriages to their start positions at the front of the machine. At the beginning of this final rescan operation, the motor switch 90 had just been closed by the trip rod. When the line carriage reaches its forwardmost position it engages the peg bar 114 to move the peg bar forwardly, against its resilient latch, a distance sufficient to open the auto switch 91. The motor 20 continues to operate since the motor switch 90 has been closed at the end of the preceding read operation; and the read and control carriages continue to be driven to their start positions.

The control carriage abutment 127 engages the read bar pin 128 to rotate this bar to position the dog 96 in interference alignment with the spline shaft collar 97. This conditions the read bar 94 to shift the spline shaft forward at the beginning of a succeeding machine cycle. Simultaneously, the right stop 106 of the trip rod is engaged to effect the reversal of the reversing drive mechanism 54, also to condition the machine for a read operation at the beginning of a succeeding machine cycle, and the motor switch 90 is opened. This shuts off the machine which is now in condition for another automatic machine cycle to be initiated by the actuation of the read lever 93.

For manual operation, the auto lever 113 is shifted forward, this moving the peg bar 114 to the forward latch position wherein the peg bar pegs 115 are positioned out of interference alignment with the plunger latch spring 120, and wherein the auto switch 91 is not operated by the peg bar and remains open.

The manual operation of the machine may be begun in the same manner as above described by operation of the read lever 93, wherein the line and head carriages are driven rearwardly to select the topmost line group of the lesson card; and the machine will automatically proceed through a single read and rescan operations. At the end of the read operation, the plunger 116 is not released; and therefore the head and line carriages will not be advanced during the subsequent rescan operation, and the read and control carriages will return to their start positions along the same paths. At the end of the rescan operation, the trip bar 101 effects the opening of the motor switch 90 to shut off the machine.

Subsequent operations of the read lever 93 will start the drive motor and the machine will proceed through an additional read operation and rescan operation for the same topmost line group, after which the machine will again shut off. The operator may then effect a repeated reading of the same topmost line as desired by a repeated operation of the read lever 93.

Through operation of the manual drive wheel 78, the operator may select any line group 11, 12 on the lesson card 10; and may then effect repeated reading of the newly selected line group as often as desired.

Alternative to starting the machine in the above-described manner, the user may initially move the line and head carriages from the start positions to a selected line group on the lesson card through the manual drive wheel 78. As soon as the line carriage has moved sufficiently to disengage the abutment 127 from the read bar pin 128, the read bar 94 is conditioned so that operation of the read lever 93 will only serve to start the machine motor and will not effect rearward drive of the line and head carriages.

Similarly the operator may return the line and head carriages to the start positions at the front of the machine through the manual control wheel 78. When the line carriage is returned to its home position, the control carriage abutment 127 will cam the read bar 94 to the interference position with the spline shaft to condition the machine for a subsequent automatic cycle.

At any time during the operation of the machine in the automatic mode, the mode switch 113 may be shifted to the manual position; and when the read and control carriages next return to their start positions, the machine will shut off as described. Further operations may then be carried out in the manual mode of operation. Similarly, during operation in the manual mode, the mode switch may be shifted back to the auto position and the machine will then proceed automatically through the remainder of the machine cycle from the extant point on the lesson card 10.

What has been described is a very versatile teaching machine for use with lesson information presented in convenient form with a fixed physical relationship between recorded and printed lesson segments. With the apparatus described, the student is enabled to listen to and simultaneously read lesson segments. The apparatus is also adapted for the use of teaching character systems such as Braille system wherein the student may listen to the lesson segment while his fingers are guided over the corresponding character symbols. The apparatus is versatile in that the student may repeat either a single line of lesson material or any group of lines of lesson material as often as desired to provide maximum utility of the apparatus for various types of lesson materials.

While one embodiment of the invention has been illustrated and described, it will be understood by those skilled in the art that changes and modifications such as the provisions of a reversible drive motor in lieu of a reversing transmission may be resorted to without departing from the spirit and scope of the invention.

What is claimed is:

1. Apparatus for use with teaching material in sheet form having spaced parallel information line groups, each line group including a first line of recorded information and an adjacent second line of sensible printed or tactile information: the apparatus comprising
a frame including means for supporting teaching material in a plane; first carriage means mounted on said frame for rectilinear movement in a plane parallel to the supporting plane, to traverse information line groups;
second carriage means mounted on said first carriage means for rectilinear movement in a parallel plane transverse to the movement of said first carriage, to follow an information line group; means on said second carriage means for detecting information in a recorded line and for indicating information in an adjacent sensible line;
cam means provided on said frame; and cam follower means mounted on said second carriage means for selective engagement with said cam means to effect incremental advance of said first carriage means in one direction relative to said frame, in response to movement of said second carriage means in one direction relative to said first carriage means.

2. Apparatus as set forth in claim 1
wherein said second carriage means includes a second carriage mounted for movement in a parallel plane on one side of said frame and carrying said information detecting and indicating means, and a third carriage mounted for concomitant movement in a parallel plane on the other side of said frame and carrying said cam follower means.

3. Apparatus as set forth in claim 2
including reversible power drive means for driving said second and third carriages relative to said first carriage.

4. Apparatus as set forth in claim 1
including manual drive means for driving said first carriage means relative to said frame to select a line group.

5. Apparatus as set forth in claim 2
wherein said second and third carriages are mounted for movement in a direction perpendicular to the movement of said first carriage means;
wherein said cam means includes spaced elongated groove means provided in said frame and aligned in a direction transverse to that of said first carriage movement and inclined relative to that of said third carriage movement.

6. Apparatus as set forth in claim 2
wherein said follower means mounted on said third carriage comprises a plunger mounted for movement in a direction transverse to said planes; spring means urging said plunger into engagement with said cam grooves; releasable latch means for latching said plunger out of engagement with said cam grooves;
latch release means mounted on said frame engageable by said third carriage at one limit of its travel to release said releasable latch means; and cam means mounted on said frame engageable by said third carriage plunger at the other limit of third carriage travel moving said plunger to the latched position.

7. Apparatus as set forth in claim 6
wherein said latch release means is selectively shiftable on said frame between a first position, wherein said latch release means is engaged by said third carriage at said one limit of travel, and a second position wherein said latch release means is not engaged by said third carriage at said one limit of travel.

8. Apparatus as set forth in claim 2
power drive means for said carriage means including an electric drive motor and a reversing mechanism; means for alternatively coupling said drive means to said first carriage means or to said second and third carriages;
means responsive to the limit of movement of said first carriage means in one direction for uncoupling said drive means from said first carriage means and for coupling said drive means to said second and third carriages;
and means responsive to the limits of movements of said third carriage for actuating said reversing mechanism for effecting the drive of said second and third carriages in opposite directions.

9. Apparatus as set forth in claim 8
including a cable drive mechanism for moving said first carriage means relative to said frame; means for manually operating said cable drive mechanism for either direction of movement of said first carriage means; and wherein said coupling means couples said cable drive mechanism to said power drive means.

10. Apparatus as set forth in claim 8
a first cable drive mechanism for moving said first carriage relative to said frame; a second cable drive mechanism for moving said second and third carriages simultaneously relative to said first carriage;
wherein said drive means includes an axially shiftable spline shaft; a first drive pulley for said first cable drive mechanism rotatably mounted on said spline shaft and axially confined thereon; a second drive pulley for said second cable drive mechanism slidably mounted on said spline shaft for rotation therewith, and rotatably supported on said first carriage;

said reversing mechanism being rotatably mounted on said spline shaft and being axially confined relative to said frame; shift means associated with said reversing mechanism for selectively coupling said reversing mechanism to said drive motor for rotation in opposite directions; and means for axially shifting said spline shaft to rotatively couple said reversing mechanism alternatively to said first drive pulley and to said spline shaft.

11. Teaching apparatus comprising a frame; teaching material in sheet form having spaced parallel information line groups, each line group including a first line of recorded information and an adjacent second line of sensible printed or tactile information; means on said frame defining a supporting plane for one or more sheets of said teaching material;

first carriage means mounted on said frame for rectilinear movement in a plane parallel to the supporting plane to traverse information line groups; second carriage means mounted on said first carriage means for rectilinear movement in a parallel plane transverse to the movement of the said first carriage means, to follow an information line group;

means on said second carriage means for detecting information in a recorded line and for indicating information in an adjacent printed line;

coacting means provided on said frame and on said second carriage means for selective engagement, to effect progressive incremental advance of said first carriage means to successive line groups.

12. Apparatus as set forth in claim 11 wherein said means for detecting and indicating information is mounted for movement transverse to said supporting plane to accommodate one or a plurality of teaching material sheets.

13. Apparatus as set forth in claim 11 wherein said coacting means acts to effect an incremental advance of said first carriage means in response to each movement of said second carriage means in one direction relative to said first carriage means.

14. Apparatus as set forth in claim 13 including power drive means for driving said second carriage means relative to said first carriage means.

15. Apparatus as set forth in claim 11 including manual drive means for driving said first carriage means relative to said frame to select a line group.

16. Apparatus as set forth in claim 11 wherein said first carriage means includes a first carriage traversing said frame above said supporting plane and a second carriage traversing said frame below said supporting frame; said first carriage being mounted for transverse movement relative to said supporting plane to accommodate one or a plurality of teaching material sheets supported on said supporting plane;

wherein said second carriage means includes a third carriage mounted for rectilinear movement on said first carriage, and a fourth carriage mounted for concomitant rectilinear movement on said second carriage; said third carriage carrying said means for detecting and indicating information on a teaching material sheet; and said fourth carriage carrying means coacting with said frame for effecting incremental advance of said first carriage means.

* * * * *